US009836974B2

United States Patent
Kawamoto et al.

(10) Patent No.: US 9,836,974 B2
(45) Date of Patent: Dec. 5, 2017

(54) ON-DEMAND VEHICLE OPERATION MANAGEMENT DEVICE, ON-DEMAND VEHICLE OPERATION MANAGEMENT METHOD, AND ON-DEMAND VEHICLE OPERATION MANAGEMENT SYSTEM

(71) Applicants: Masayuki Kawamoto, Toyota (JP); Hiroko Mori, Nagakute (JP); Hironobu Kitaoka, Nisshin (JP)

(72) Inventors: Masayuki Kawamoto, Toyota (JP); Hiroko Mori, Nagakute (JP); Hironobu Kitaoka, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/430,039

(22) PCT Filed: Sep. 20, 2012

(86) PCT No.: PCT/JP2012/073984
§ 371 (c)(1),
(2) Date: Mar. 20, 2015

(87) PCT Pub. No.: WO2014/045359
PCT Pub. Date: Mar. 27, 2014

(65) Prior Publication Data
US 2015/0228192 A1 Aug. 13, 2015

(51) Int. Cl.
*G01C 21/26* (2006.01)
*G08G 1/123* (2006.01)
(Continued)

(52) U.S. Cl.
CPC ............. *G08G 1/123* (2013.01); *G01C 21/34* (2013.01); *G06Q 10/047* (2013.01);
(Continued)

(58) Field of Classification Search
CPC combination set(s) only.
See application file for complete search history.

(56) References Cited

U.S. PATENT DOCUMENTS 4,791,571 A * 12/1988 Takahashi ............... G08G 1/127
340/910
5,948,040 A * 9/1999 DeLorme ............... G01C 21/36
340/990
(Continued)

FOREIGN PATENT DOCUMENTS

CN         1548924 A     11/2004
CN     101075378 A     11/2007
(Continued)

OTHER PUBLICATIONS

Partial Translation of corresponding Japanese Application dated Nov. 10, 2015 with Statement of Relevancy.
(Continued)

*Primary Examiner* — Jonathan L Sample
(74) *Attorney, Agent, or Firm* — Oblon, McClelland, Maier & Neustadt, L.L.P.

(57) ABSTRACT

An operation management center divides an operation area in which an on-demand bus operates into a plurality of predetermined sub-areas, and searches for candidate routes on which the on-demand bus travels for each divided sub-area. The center sets one of the retrieved routes as a basic route, and sets, as adjustment time for each divided sub-area, time required when the bus passes through a location separated from the basic route. Thus, by setting such adjustment time for each sub-area, and by using the adjustment time set for each sub-area, the center can determine an operation plan that takes into account an additional request while reducing an impact on the determined operation plan.

13 Claims, 8 Drawing Sheets

(51) Int. Cl.
    *G08G 1/127* (2006.01)
    *G08G 1/00* (2006.01)
    *G01C 21/34* (2006.01)
    *G06Q 10/04* (2012.01)
    *G06Q 10/06* (2012.01)
    *G06Q 50/30* (2012.01)
(52) U.S. Cl.
    CPC ......... *G06Q 10/0631* (2013.01); *G08G 1/127* (2013.01); *G08G 1/202* (2013.01); *G06Q 50/30* (2013.01)

(56) References Cited

U.S. PATENT DOCUMENTS

| | | | | |
|---|---|---|---|---|
| 5,987,377 | A * | 11/1999 | Westerlage | G01C 21/26 340/994 |
| 6,240,362 | B1 * | 5/2001 | Gaspard, II | G01C 21/343 340/991 |
| 6,385,537 | B2 * | 5/2002 | Gaspard, II | G01C 21/343 340/991 |
| 6,401,027 | B1 * | 6/2002 | Xu | G08G 1/0104 340/988 |
| 6,411,891 | B1 * | 6/2002 | Jones | G06Q 10/08 342/357.395 |
| 6,411,897 | B1 * | 6/2002 | Gaspard, II | G01C 21/343 340/991 |
| 6,510,383 | B1 * | 1/2003 | Jones | G01C 21/343 340/993 |
| 6,615,130 | B2 * | 9/2003 | Myr | G01C 21/3492 340/988 |
| 6,741,927 | B2 * | 5/2004 | Jones | G08G 1/123 340/989 |
| 7,219,159 | B2 * | 5/2007 | Mouri | H04L 45/12 370/238 |
| 7,590,490 | B2 * | 9/2009 | Clark | G01C 21/3415 340/994 |
| 7,657,370 | B2 * | 2/2010 | Nagase | G01C 21/3492 340/995.13 |
| 7,865,298 | B2 * | 1/2011 | Macneille | B60K 6/365 340/995.19 |
| 8,046,169 | B2 * | 10/2011 | Mazlum | G01S 19/50 180/170 |
| 8,315,784 | B2 * | 11/2012 | Endo | G01C 21/3492 340/905 |
| 8,452,530 | B2 * | 5/2013 | Inoguchi | G01C 21/3492 701/414 |
| 2001/0056325 | A1 * | 12/2001 | Pu | G01C 21/26 701/533 |
| 2002/0049535 | A1 * | 4/2002 | Rigo | G01C 21/3629 701/431 |
| 2002/0055818 | A1 * | 5/2002 | Gaspard, II | G01C 21/343 701/410 |
| 2002/0077746 | A1 * | 6/2002 | Zuber | G01C 21/3423 701/533 |
| 2003/0128135 | A1 * | 7/2003 | Poltorak | G08G 1/081 340/906 |
| 2003/0128139 | A1 * | 7/2003 | Poltorak | G08G 1/0969 340/995.19 |
| 2003/0146854 | A1 * | 8/2003 | Jones | G08G 1/123 340/988 |
| 2003/0195696 | A1 * | 10/2003 | Jones | G08G 1/123 701/517 |
| 2004/0030493 | A1 * | 2/2004 | Pechatnikov | G01C 21/26 701/411 |
| 2004/0225437 | A1 * | 11/2004 | Endo | G01C 21/34 701/415 |
| 2004/0249568 | A1 * | 12/2004 | Endo | G01C 21/3492 701/410 |
| 2004/0260465 | A1 * | 12/2004 | Tu | G01C 21/34 701/426 |
| 2004/0260466 | A1 * | 12/2004 | Ichihara | G01C 21/343 701/420 |
| 2005/0033511 | A1 * | 2/2005 | Pechatnikov | G01C 21/26 701/411 |
| 2005/0137792 | A1 * | 6/2005 | Tsuge | G01C 21/3492 701/414 |
| 2005/0209772 | A1 * | 9/2005 | Yoshikawa | G08G 1/096827 340/995.13 |
| 2005/0251334 | A1 * | 11/2005 | Mizuno | G01C 21/3682 701/533 |
| 2005/0283311 | A1 * | 12/2005 | Ohler | G01C 21/3415 701/424 |
| 2006/0004511 | A1 * | 1/2006 | Yoshikawa | G01C 21/3492 701/532 |
| 2006/0271283 | A1 * | 11/2006 | Fraser | G01C 21/3641 701/533 |
| 2007/0005240 | A1 * | 1/2007 | Oumi | G01C 21/3484 701/425 |
| 2007/0005242 | A1 * | 1/2007 | Kato | G01C 21/343 701/467 |
| 2007/0124068 | A1 * | 5/2007 | Nakayama | G01C 21/3655 701/414 |
| 2007/0208495 | A1 * | 9/2007 | Chapman | G08G 1/0104 701/117 |
| 2007/0208498 | A1 * | 9/2007 | Barker | G08G 1/0104 701/117 |
| 2007/0233384 | A1 * | 10/2007 | Lee | G01C 21/3611 701/469 |
| 2008/0010011 | A1 * | 1/2008 | Glaza | G01C 21/32 701/533 |
| 2008/0027772 | A1 * | 1/2008 | Gernega | G06Q 10/04 705/7.26 |
| 2008/0140309 | A1 * | 6/2008 | Jendbro | G01C 21/3614 701/533 |
| 2008/0183376 | A1 * | 7/2008 | Knockeart | G01C 21/3415 701/119 |
| 2008/0195428 | A1 * | 8/2008 | O'Sullivan | G06Q 10/00 705/6 |
| 2008/0262717 | A1 * | 10/2008 | Ettinger | G01C 21/3476 701/467 |
| 2008/0319648 | A1 * | 12/2008 | Poltorak | G08G 1/0969 701/423 |
| 2009/0048774 | A1 * | 2/2009 | Yoshioka | G01C 21/343 701/533 |
| 2009/0204320 | A1 * | 8/2009 | Shaffer | G01C 21/3415 701/533 |
| 2009/0234659 | A1 * | 9/2009 | Liao | G06Q 10/047 705/5 |
| 2010/0094532 | A1 * | 4/2010 | Vorona | G08G 1/0104 701/119 |
| 2010/0312466 | A1 * | 12/2010 | Katzer | G01C 21/3492 701/533 |
| 2010/0332132 | A1 * | 12/2010 | Okude | G01C 21/3476 701/414 |
| 2011/0153143 | A1 * | 6/2011 | O'Neil | A01B 69/007 701/31.4 |
| 2011/0191017 | A1 * | 8/2011 | Certin | G01C 21/3484 701/532 |
| 2012/0041675 | A1 * | 2/2012 | Juliver | G06Q 10/08 701/465 |
| 2012/0078509 | A1 * | 3/2012 | Choi | G01C 21/3461 701/423 |
| 2012/0158289 | A1 * | 6/2012 | Bernheim Brush | G01C 21/3484 701/425 |
| 2013/0018574 | A1 * | 1/2013 | Adler | G01C 21/3492 701/408 |
| 2013/0046456 | A1 * | 2/2013 | Scofield | G01C 21/3423 701/117 |
| 2013/0158846 | A1 * | 6/2013 | Zhang | G08G 1/127 701/117 |
| 2013/0166203 | A1 * | 6/2013 | Ukai | G01C 21/362 701/533 |

(56) References Cited

U.S. PATENT DOCUMENTS

2014/0046585 A1* 2/2014 Morris, IV ............ G01C 21/00
701/468
2015/0177017 A1* 6/2015 Jones ................ G01C 21/3682
701/428

FOREIGN PATENT DOCUMENTS

| JP | 2002-140788 A | 5/2002 |
| JP | 2007-78489 A | 3/2007 |
| JP | 2009-294904 A | 12/2009 |
| JP | 2010-244177 A | 10/2010 |
| JP | 2011-22646 A | 2/2011 |
| JP | 2012-89096 A | 5/2012 |

OTHER PUBLICATIONS

Kentaro Uesugi, et al., "A parallel operation method of a straying-type demand-bus using a K-means method", Institute of Electronics, Information and Communication Engineers, Proceedings of $19^{th}$ Data Engineering Workshop, Technical Committee on Data Engineering of Institute of Electronics, Information and Communication Engineers, Apr. 7, 2008, 9 Pages (with English Abstract).

Hiroyuki Yamato, et al., "On-demand Bus System: A New Public Transportation System which Corresponds to Users' Demand", Systems, Control and Information, Institute of Systems, Control and Information Engineers, vol. 54, No. 9, Sep. 15, 2010, 11 Pages.

Office Action dated Dec. 18, 2015 in Chinese Patent Application No. 201280075658.8 (submitting Partial English translation only).

* cited by examiner

| A100(BASIC ROUTE) | | | | |
|---|---|---|---|---|
| NODE NO. | 1 | 3 | 1001 | |
| REQUIRED TIME | 0 | 10 | 17 | |
| ADJUSTMENT TIME | 0 | 0 | 0 | |
| A110(OTHER THAN BASIC ROUTE: ROUTE VIA NODE 2 IS TAKEN INTO ACCOUNT) | | | | |
| NODE NO. | 1 | 2 | 3 | 1001 |
| REQUIRED TIME | 0 | 10 | 10 | 17 |
| ADJUSTMENT TIME | 0 | 5 | 0 | 0 |
| B100(BASIC ROUTE) | | | | |
| NODE NO. | 1001 | 4 | 5 | 1002 |
| REQUIRED TIME | 0 | 8 | 15 | 17 |
| ADJUSTMENT TIME | 0 | 0 | 0 | 0 |

US 9,836,974 B2

ON-DEMAND VEHICLE OPERATION MANAGEMENT DEVICE, ON-DEMAND VEHICLE OPERATION MANAGEMENT METHOD, AND ON-DEMAND VEHICLE OPERATION MANAGEMENT SYSTEM

TECHNICAL FIELD

The present invention relates to an on-demand vehicle operation management device, an on-demand vehicle operation management method, and an on-demand vehicle operation management system, for determining an operation plan of an on-demand vehicle based on requests received from a plurality of users and managing an operation of the on-demand vehicle in accordance with the determined operation plan.

BACKGROUND ART

Up to now, there are known, for example, an on-demand bus operation scheduling system and a method therefor, which make use of an operation track record as disclosed in Patent Literature 1. The related-art on-demand bus operation scheduling system or the like includes: a database for storing the operation track record regarding a reservation and a track record in terms of getting on/off of a passenger; means for extracting characteristic information relating to the getting on/off of the passenger in advance from the operation track record stored in the database, and storing the extracted characteristic information and reservation information indicating the reservation included in the operation track record corresponding to the extracted characteristic information in the database in association with each other; and means for determining, when a current situation that determines an operation schedule is consistent with a situation indicated by the characteristic information, the operation schedule of an on-demand bus based on reservation information included in the operation track record corresponding to the consistent characteristic information.

Further, up to now, there is also known, for example, a vehicle operation system disclosed in Patent Literature 2. In this related-art vehicle operation system, a new reservation combination, that is, a new combination of a demand content currently registered in a reservation list and a new demand content, is created when a new operation plan candidate is created. In regard to the new reservation combination, calculation of a zone dispatch level index and a primary assessment thereof based on a zone dispatch level reference index for each pre-defined zone (urban area, old urban area, or mountain area) are performed, while calculation of a service index and an operation index and a primary assessment thereof are performed. Accordingly, the new reservation combination that has passed both the primary assessments is put in an overall rank, based on which a new operation plan is determined.

CITATION LIST

Patent Literature

[PTL 1] JP 2011-22646 A
[PTL 2] JP 2009-294904 A

SUMMARY OF INVENTION

Incidentally, in the related-art systems and the like disclosed in Patent Literatures 1 and 2, when a user wishing to use the on-demand bus (on-demand vehicle) newly emerges after the operation schedule (operation plan) has been determined, in order to satisfy the newly emerged user's request, there may arise a situation where the determined operation schedule (operation plan) needs to be greatly changed. In other words, in the operation schedule (operation plan) determined by the related-art systems and the like disclosed in Patent Literatures 1 and 2, a degree of freedom for changes and adjustments is low. This increases the impact of the request addition on the entire operation schedule (operation plan). Thus, in such a case, time may be required for changing or adjusting the determined operation schedule (operation plan), and no operation schedule (operation plan) satisfying the newly emerged user's request may not be determined until an operation start of the on-demand bus.

The present invention has been made in order to solve the above-mentioned problem, and it is an object thereof to provide an on-demand vehicle operation management device, an on-demand vehicle operation management method, and an on-demand vehicle operation management system, for determining an operation plan of an on-demand vehicle while securing a suitable degree of freedom.

In order to achieve the above-mentioned object, the present invention aims to improve an on-demand vehicle operation management device including operation management means for determining an operation plan of an on-demand vehicle based on requests received from a plurality of users and managing an operation of the on-demand vehicle in accordance with the determined operation plan. Further, the present invention aims to improve: an on-demand vehicle operation management method for determining, through inclusion of a computer device, an operation plan of an on-demand vehicle based on requests received from a plurality of users and managing an operation of the on-demand vehicle in accordance with the determined operation plan; and an on-demand vehicle operation management system including: an on-demand vehicle to be boarded by a plurality of users; an operation management center for determining an operation plan of the on-demand vehicle based on requests received from the plurality of users, and managing an operation of the on-demand vehicle in accordance with the determined operation plan; and an information terminal device to be operated by each of the plurality of users to supply the request to the operation management center.

A feature of the present invention resides in that the operation management means (the operation management center) has an adjustment function of: dividing an operation area in which the on-demand vehicle operates into a plurality of predetermined sub-areas; and searching for a route on which the on-demand vehicle travels for each divided sub-area, and adjusting the retrieved route. In addition, a feature of the present invention resides in that the computer device has an adjustment function of: dividing an operation area in which the on-demand vehicle operates into a plurality of predetermined sub-areas; and searching for a route on which the on-demand vehicle travels for each divided sub-area, and adjusting the retrieved route. In this case, the operation management means (the operation management center) can include dividing means for dividing the operation area in which the on-demand vehicle operates into the plurality of predetermined sub-areas.

In this case, the adjustment function of the operation management means (the operation management center) can be a function of setting, for each divided sub-area, adjustment time for adjusting time required when the on-demand vehicle travels on the retrieved route in the each divided sub-area. The computer device can set, for each divided sub-area, adjustment time for adjusting time required when the on-demand vehicle travels on the retrieved route in the each divided sub-area.

Further, in this case, the operation management means (the operation management center) can determine one of the routes retrieved for each divided sub-area as a basic route, and the adjustment time set for the each divided sub-area by the adjustment function of the operation management means can be adjustment time for adjusting time required when the on-demand vehicle traveling on the basic route passes through a location separated from the basic route. Further, the computer device can determine one of the routes retrieved for each divided sub-area as a basic route, and set, for the each divided sub-area, adjustment time for adjusting time required when the on-demand vehicle traveling on the basic route passes through a location separated from the basic route.

Further, in those cases, the operation management means can determine, when a request is added by a new user after the operation plan has been determined, an operation plan that takes into account the additional request made by the new user by using the adjustment time set for each divided sub-area. Further, the computer device can determine, when a request is added by a new user after the operation plan has been determined, an operation plan that takes into account the additional request made by the new user by using the adjustment time set for each divided sub-area. Further, the operation management center can determine, when a request is added by a new user through the information terminal device after the operation plan has been determined, an operation plan that takes into account the additional request made by the new user by using the adjustment time set for each divided sub-area.

Further, another feature of the present invention resides in that the operation management means is configured to: divide an operation area in which the on-demand vehicle operates into a plurality of predetermined sub-areas; determine, for a reservation received from each of the plurality of users before the operation plan of the on-demand vehicle is determined, a candidate route that is included in the reservation, passes through a desired boarding/drop-off location requested by the each of the plurality of users, and allows the on-demand vehicle to operate at desired time, and determine that the each of the plurality of users is allowed to board the on-demand vehicle when the candidate route is present; calculate, before the operation plan of the on-demand vehicle is determined, a predetermined evaluation expression for all the determined candidate routes to select a candidate route having an optimal solution as an operation route, and determine an operation plan of the on-demand vehicle that takes into account adjustment time for adjusting time required when the on-demand vehicle travels on the operation route; and use, for an additional reservation received from each of the plurality of users after the operation plan of the on-demand vehicle is determined, the adjustment time taken into account on the operation route in the determined operation plan of the on-demand vehicle to change and determine the operation route so as to allow the operation route to pass through a desired boarding/drop-off location requested by the each of the plurality of users and to allow the on-demand vehicle to operate at desired time.

In addition, in this case, the operation management means can be configured to: compare a request included in the reservation received from the each of the plurality of users before the operation plan of the on-demand vehicle is determined with a past request included in a reservation received in the past and at the same time slot and in the same sub-area as a time slot and a sub-area of the request; and take into account the adjustment time in accordance with a time slot and a sub-area higher in frequency in the past request. Further, in those cases, the operation management means can be configured to: search for a route for each of the plurality of predetermined sub-areas; determine one of the retrieved routes as a basic route; and take into account the adjustment time as adjustment time for adjusting time required when the on-demand vehicle traveling on the basic route passes through a location separated from the basic route.

According to those, the operation management means (computer device or operation management center) can be provided with the adjustment function of dividing the operation area in which the on-demand vehicle operates into the plurality of predetermined sub-areas, and adjusting the retrieved route for each divided sub-area, that is, the function of setting, for each sub-area, the adjustment time for adjusting the time required when the on-demand vehicle travels on the retrieved route. Then, by using the adjustment time set for each sub-area, the operation management means (computer device or operation management center) can determine the operation plan that takes into account the additional request made by the new user after the operation plan has been determined.

Thus, for example, as compared with a case where the operation of the on-demand vehicle is managed by uniformly adding time in order to prepare for occurrence of uncertainties that may hinder the operation from a point of departure to a destination, time wasted in operation can be further suppressed by setting sufficient adjustment time necessary for each sub-area. Moreover, by setting the sufficient adjustment time necessary for each sub-area, an operation plan with a high degree of freedom can be determined by using the adjustment time.

In other words, the adjustment time is set for each sub-area, and is different from time that is set after a location is specified, such as time required when the vehicle passes through each specific location in the sub-area. Thus, by determining an operation plan that takes the adjustment time into account, for example, even when the new user adds a request, as long as time required when the on-demand vehicle passes through a route to a boarding/drop-off location desired by the user is within the adjustment time set for each sub-area where the boarding/drop-off location is present, the impact on the other users' use of the on-demand vehicle can be reduced very greatly. In other words, by enabling setting of the adjustment time for each sub-area, the degree of freedom in the determined operation plan can be increased. Even when another request is added to the operation plan that has been determined once, this request can be added while reducing the impact on the entire operation plan. As a result, a new operation plan can be quickly determined.

Further, in those cases, the operation management means (computer device or operation management center) can determine the operation plan, for example, so as to allow break time to be secured for a driver of the on-demand vehicle. Thus, the driver of the on-demand vehicle can get an adequate break to appropriately operate the on-demand vehicle.

DESCRIPTION OF EMBODIMENT

Now, an on-demand vehicle operation management device according to an embodiment of the present invention (hereinafter referred to as "this device") is described with reference to the accompanying drawings.

Figure 1:
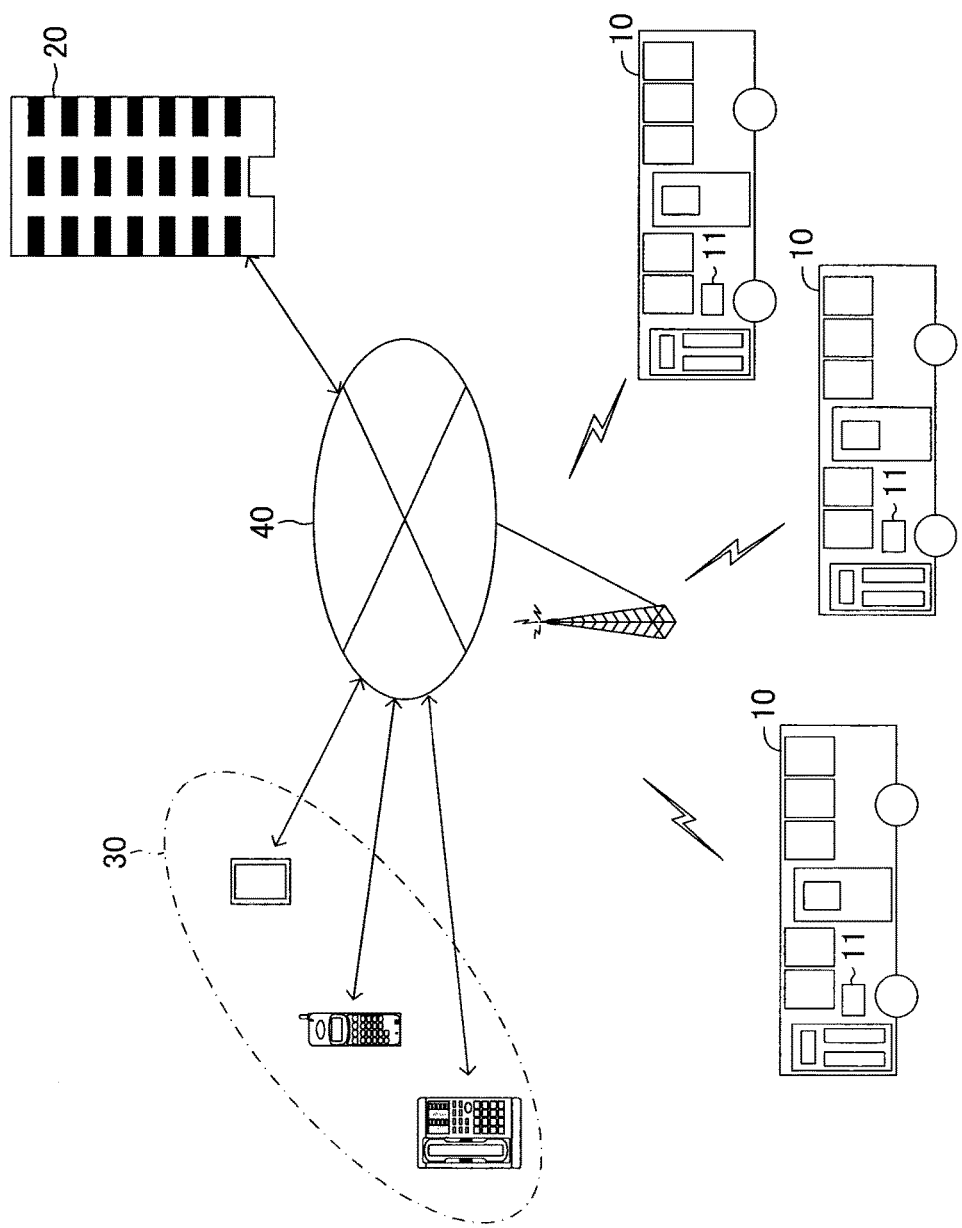
FIG. 1 is a schematic diagram of an on-demand vehicle operation management system to which an on-demand vehicle operation management device according to an embodiment of the present invention can be applied.

FIG. 1 illustrates a schematic configuration of an on-demand vehicle operation management system for managing an operation of an on-demand vehicle to which this device can be applied. The on-demand vehicle operation management system according to this embodiment includes: on-demand buses 10, which correspond to a plurality of on-demand vehicles operated in response to requests (demands) received from a plurality of users; an operation management center 20 including this device, for determining operation plans of the respective on-demand buses 10 and managing operations thereof; and an information terminal device 30 owned by each user. Further, in this on-demand vehicle operation management system, the respective on-demand buses 10 (more specifically, operation information terminal devices 11 described later), the operation management center 20, and the information terminal devices 30 are communicably connected to each other by a network 40 such as an Internet line network or a mobile phone line network.

Figure 2:
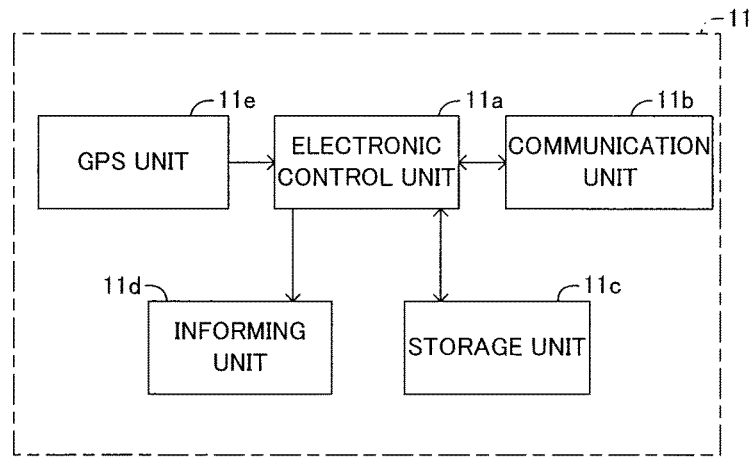
FIG. 2 is a block diagram schematically illustrating a configuration of an operation information terminal device mounted to a vehicle illustrated in FIG. 1.

The on-demand bus 10 is a motor-omnibus in which, as well known, an operation route, operation time, and the like (hereinafter also referred to collectively as "operation plan") are not defined in advance and which travels within a specific region in accordance with the operation plan determined appropriately in response to the user's request (demand) by the operation management center 20 described later. For this reason, the operation information terminal device 11 for transmitting and receiving various kinds of information including operation plan information indicating the operation plan through communications to/from the operation management center 20 is mounted to the on-demand bus 10. As illustrated in FIG. 2, the operation information terminal device 11 includes an electronic control unit 11a, a communication unit 11b, a storage unit 11c, an informing unit 11d, and a GPS unit 11e.

The electronic control unit 11a is a microcomputer including a CPU, a ROM, a RAM, and the like as its main component parts, and centrally controls an operation of the operation information terminal device 11 mounted to the on-demand bus 10. The communication unit 11b is configured to realize communications to/from the operation management center 20 through radio communications performed via the network 40. The storage unit 11c includes a storage medium such as a hard disk or a semiconductor memory and a drive for driving the storage medium. Further, the storage unit 11c stores a program necessary for the electronic control unit 11a to centrally control the operation of the operation information terminal device 11 and various kinds of data including the operation plan information provided by the operation management center 20 as described later, in advance or in an updatable manner. The informing unit 11d is formed of a display, a speaker, or the like. Further, the informing unit 11d is configured to inform of the operation plan information by displaying a character, a graphic form, or the like on a screen of the display or outputting voice from the speaker under control of the electronic control unit 11a. The GPS unit 11e is configured to receive a radio wave from a global positioning system (GPS) satellite, to detect a location of the on-demand bus 10 to which the operation information terminal device 11 is mounted.

Figure 3:
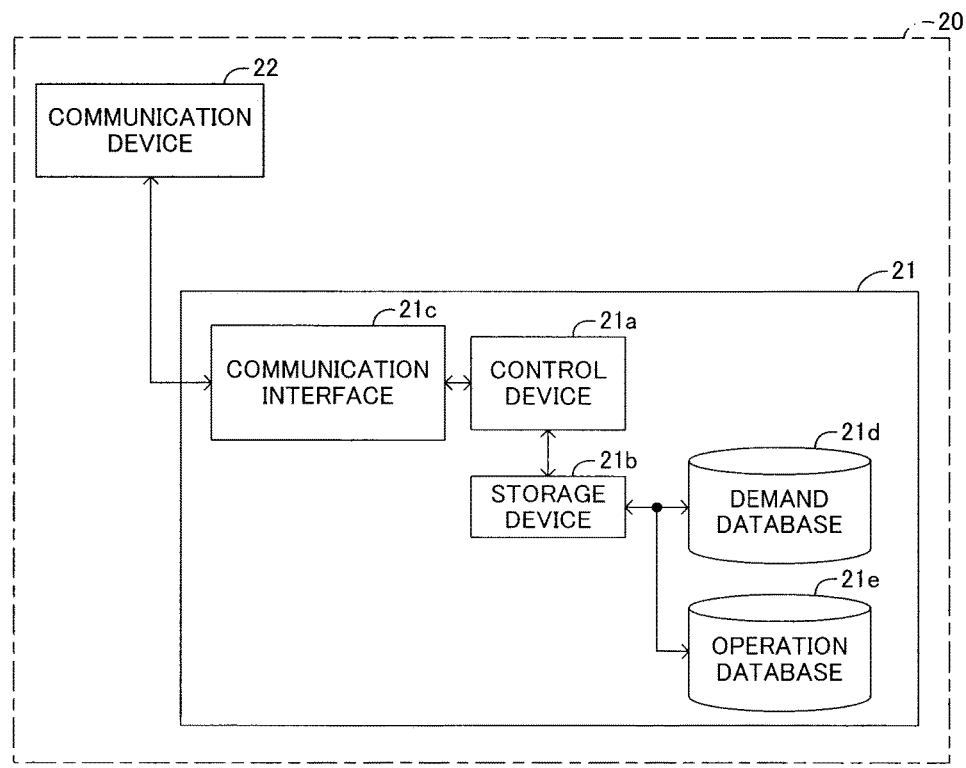
FIG. 3 is a block diagram schematically illustrating a configuration of an operation management center illustrated in FIG. 1.

The operation management center 20 is configured to manage the operation of the on-demand bus 10 by determining the operation plan of the on-demand bus 10 corresponding to the user's request (demand) and providing the on-demand bus 10 with the operation plan information. Further, the operation management center 20 is configured to provide the user with the operation plan information and provide the user with various kinds of information on the operation of the on-demand bus 10. For this reason, as illustrated in FIG. 3, the operation management center 20 includes a server 21 and a communication device 22.

The server 21 includes a control device 21a, a storage device 21b, and a communication interface 21c. The control device 21a includes a microcomputer formed of a CPU, a ROM, a RAM, and the like as its main component part, and centrally controls an operation of the server 21 relating to the determination of the operation plan and the management of the operation for each on-demand bus 10 (or each service for operating the on-demand bus 10). The storage device 21b includes a storage medium such as a hard disk or a semiconductor memory and a drive for driving the storage medium, and stores various programs and various kinds of data. The communication interface 21c is an interface for connection to a communication line (for example, LAN line) built within the operation management center 20. The storage device 21b has built therein a demand database 21d for accumulating and storing demand information (hereinafter also referred to as user's "reservation information") on a demand (that is, request) of each on-demand bus 10 in a searchable manner, and an operation database 21e for accumulating and storing operation information including operation plan information of each on-demand bus 10 in a searchable manner.

The demand database 21d accumulates and stores, in a searchable manner, demand information on the user's use of the on-demand bus 10, specifically, desired boarding/drop-off location information indicating a desired boarding/drop-off location, desired time information indicating desired departure or arrival time, boarding/drop-off status information indicating added time acceptable by the user with respect to the desired departure or arrival time, and user identification information for identifying the user in association with one another. The operation database 21e accumulates and stores, in a searchable manner, operation information on the operation of the on-demand bus 10 in accordance with the user's demand (request), specifically, in addition to the operation plan information indicating an operation route or operation time, passenger number information indicating the number of passengers wishing to board the on-demand bus 10, that is, wishing to use the operation service of the on-demand bus 10 in accordance with the operation plan, and bus identification information for identifying the on-demand bus 10 in association with each other.

The communication device 22 is connected to the server 21 via the communication line built within the operation management center 20. Then, the communication device 22 is configured to realize communications to/from the operation information terminal device 11 and the information terminal device 30 by being connected to the network 40. Accordingly, the communication device 22 transmits and receives the bus identification information and the operation information (in particular, the operation plan information) to and from the operation information terminal device 11. Further, the communication device 22 transmits and receives the user identification information and the reservation information (demand information) to and from the information terminal device 30, and transmits thereto the determined operation plan information and decline information indicating that the user's request (demand) cannot be satisfied in regard to the use of the on-demand bus 10.

Figure 4:
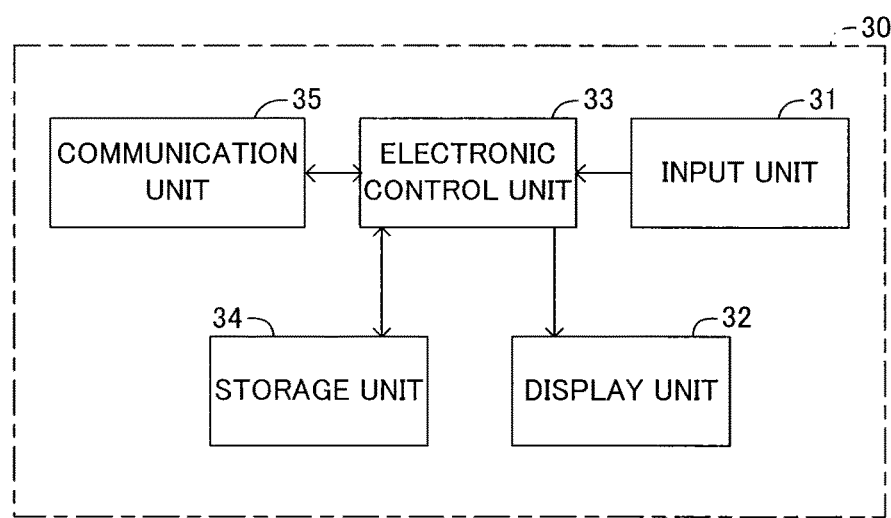
FIG. 4 is a block diagram schematically illustrating a configuration of an information terminal device illustrated in FIG. 1.

The information terminal device 30 is configured to be operated by the user to transmit the demand information (reservation information) to the operation management center 20, and receive the operation plan information and the decline information from the operation management center 20 in the form of, for example, character data using electronic mail or a voice call. For this reason, as illustrated in FIG. 4, the information terminal device 30 includes an input unit 31, a display unit 32, an electronic control unit 33, a storage unit 34, and a communication unit 35 that are communicably connected to one another. The input unit 31 is formed of, for example, a keyboard, a touch panel keyboard built in the display unit 32 to detect a touch operation on a display panel of the display unit 32, or a speech input device capable of a call to/from an outside (specifically, operator resident in the operation management center 20). The display unit 32 is formed of, for example, a liquid crystal display, and is configured to display a character, a graphic form, or the like on the display panel.

The electronic control unit 33 includes a microcomputer formed of a CPU, a ROM, a RAM, and the like as its main component part, and centrally controls operations of the input unit 31, the display unit 32, the storage unit 34, and the communication unit 35 by executing various application programs. The storage unit 34 stores the various application programs and various kinds of data used by the electronic control unit 33 to centrally control the operation of the information terminal device 30, and stores the user identification information (specifically, user ID, password, and the like) necessary to access the operation management center 20 when transmitting the reservation information (demand information). The communication unit 35 is connected to the network 40 to implement a function of transmitting and receiving the user identification information, the reservation information (demand information), the operation plan information, the decline information, speech data, and the like to and from the operation management center 20.

Here, specific examples that can be employed as the information terminal device 30 include a mobile phone such as a smartphone, a tablet information terminal, and a laptop personal computer. Note that, it should be understood in this case that, for example, a desktop personal computer placed at home or the like and a fixed-line phone placed at home or the like can be used irrespective of inferior portability thereof.

Figure 5:
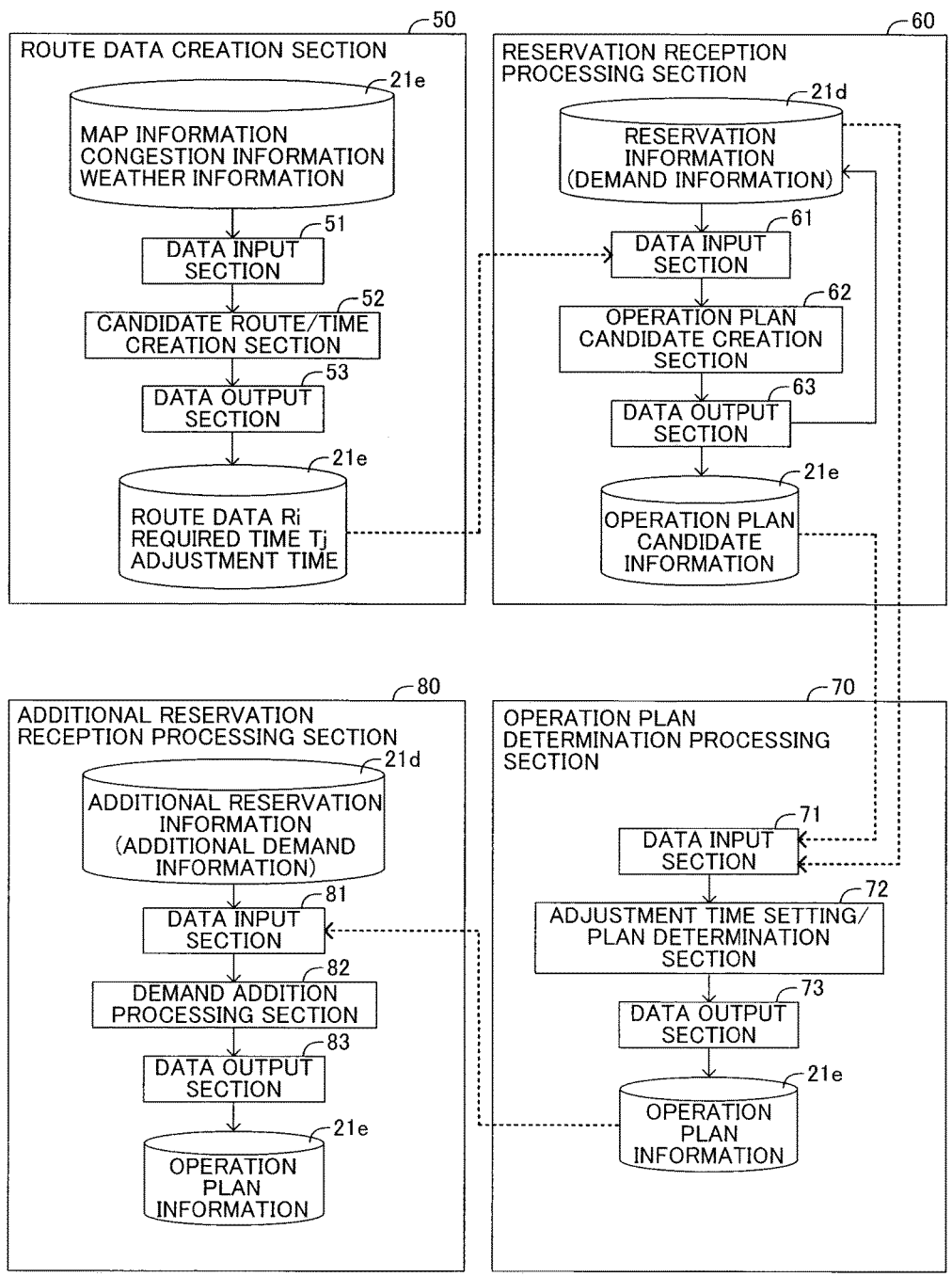
FIG. 5 is a functional block diagram functionally illustrating computer program processing executed by a server (computer) illustrated in FIG. 3.

Next, the operation of this embodiment configured as described above is described with reference to a functional block diagram. As illustrated in FIG. 5, the server 21 (more specifically, control device 21a) of the operation management center 20 according to this embodiment includes a route data creation section 50, a reservation reception processing section 60, an operation plan determination processing section 70, and an additional reservation reception processing section 80. Note that, although not being described in detail, the server 21 of the operation management center 20 is configured to collect map information indicating roads, topography, and the like, congestion information (such as congestion degree or driving time required in the road segment or a predetermined segment) on a road segment indicated by a segment between nodes on each road such as intersections, weather conditions, the current location of the on-demand bus 10, and the like as current information on an operation region (operation zone), which is an operation area within which the on-demand bus 10 is being operated, and to store the current information in a predetermined storage location of an operation database 21e. Further, the number of on-demand buses 10 to be operated is appropriately determined based on a size of the operation region (operation zone) as the operation area and the number of users, and is further determined based on shopping streets, hospitals, public facilities, topographic features (such as presence/absence of a slope), a time slot, and the like. Note that, in this case, by preparing the on-demand bus 10 that is not assigned to the operation region (operation zone), it is possible to carry out the operation so as to specially assign the prepared on-demand bus 10 to the operation region (operation zone) that has a small number of users who desire a ride in accordance with the request (demand) received from the user.

The route data creation section 50 includes a data input section 51. The data input section 51 acquires, from the operation database 21e, the map information (map data), the congestion information, the weather information, or the like stored in the predetermined storage location of the database 21e in an updatable manner to input the information. The data input section 51 supplies each input information to a candidate route/time creation section 52.

The candidate route/time creation section 52 divides the operation region (operation zone) as the operation area in which the on-demand bus 10 to be managed in operation travels into predetermined sub-areas (blocks), and for each sub-area, searches for a route on which the on-demand bus 10 can travel to determine the route as a candidate route. The candidate route/time creation section 52 determines time required when the on-demand bus 10 travels between locations (between nodes) on the retrieved candidate route (hereinafter referred to as "required time").

Further, the candidate route/time creation section 52 determines one of the retrieved candidate routes as a route to be a base (hereinafter referred to as "basic route") for operating the on-demand bus 10. The candidate route/time creation section 52 exhibits a function of, when a route that takes into account a route branching toward a location (node) separated from the basic route (hereinafter referred to as "route other than basic route") is retrieved, determining time required when the on-demand bus 10 stops at (passes through) the location (node) (hereinafter referred to as "adjustment time"). Now, the determination of the candidate route, the required time, and the adjustment time carried out by the candidate route/time creation section 52 is described in detail referring to FIG. 6.

Figures 6, 7:
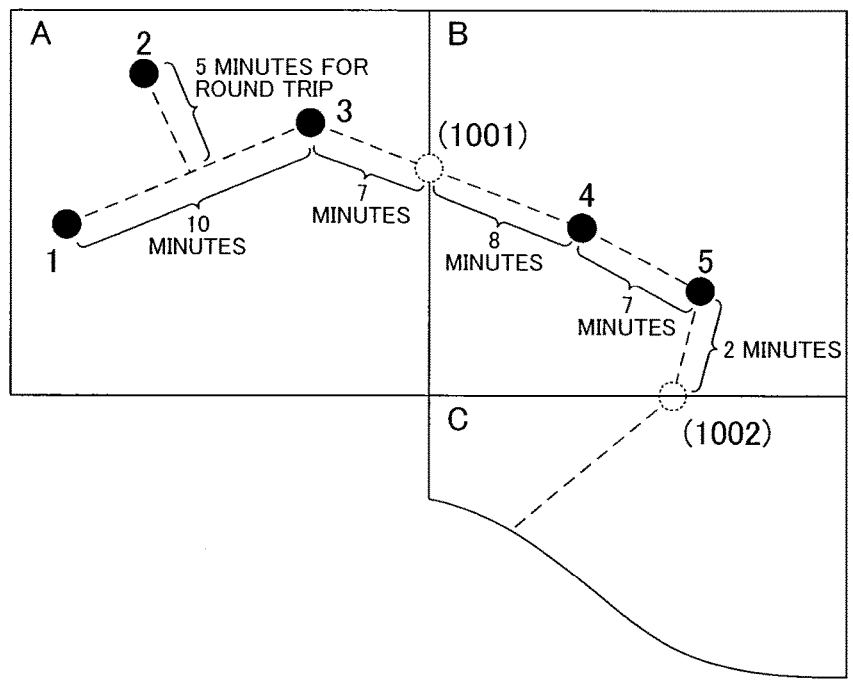
FIG. 6 is a schematic diagram illustrating determination of a candidate route, required time, and adjustment time by a route data creation section illustrated in FIG. 5.
FIG. 7 is a schematic diagram illustrating an information table of the candidate route, the required time, and the adjustment time determined and stored by the route data creation section illustrated in FIG. 5.

The candidate route/time creation section 52 searches for the route on which the on-demand bus 10 can travel by using the map information (map data) acquired from the operation database 21e via the data input section 51. At this time, the candidate route/time creation section 52 divides the operation area in which the on-demand bus 10 travels into sub-areas (blocks) of predetermined sizes based on, for example, the user's demand for the on-demand bus 10 or land use (residential area, dense zone, altitude, or the like), and searches for a basic route and a route other than the basic route for each sub-area. An example of this search is described referring to FIG. 6. The candidate route/time creation section 52 divides the operation area in which the on-demand bus 10 travels into sub-areas A, B, C, . . . . In FIG. 6, for easier understanding, the divided sub-areas A, B, C, . . . are formed into similar rectangular shapes. Needless to say, however, the division of the sub-areas is not limited to the rectangular shapes and any shape and size can be employed for the divided sub-areas (blocks).

The candidate route/time creation section 52 specifies nodes 1 to 3 present in the sub-area A based on the map information (map data), specifies a node 1001 present at a boundary with the sub-area B, and searches for a route passing through those nodes 1 to 3 and 1001. Specifically, the candidate route/time creation section 52 determines a route directly connecting the node 1 that is a point of departure in the sub-area A to the node 3, and directly connecting the node 3 to the node 1001 as a basic route A100. In the sub-area A, the node 2 separated from the basic route A100 is present, and thus the candidate route/time creation section 52 searches for a route passing through the node 2 as a route A110 other than the basic route. In other words, the candidate route/time creation section 52 searches for a route connecting the node 1 through the node 2 to the node 3 and reaching the node 1001 as the route A110 other than the basic route.

Similarly, the candidate route/time creation section 52 specifies nodes 4 and 5 present in the sub-area B based on the map information (map data), specifies the node 1001 present at the boundary with the sub-area A and a node 1002 present at a boundary with the sub-area C, and searches for a route passing through those nodes 1001, 4, 5, and 1002. Specifically, the candidate route/time creation section 52 determines a route connecting the node 1001 that is a point of departure in the sub-area B through the nodes 4 and 5 to the node 1002 as a basic route B100.

In the above description, to facilitate understanding, the nodes are simply numbered. In this case, more specifically, for example, each node can be represented by coordinates using longitude and latitude as known, needless to say. This enables representation of a space between the nodes by using longitude and latitude.

In this manner, the candidate route/time creation section 52 divides the operation area in which the on-demand bus 10 operates into the plurality of sub-areas, and searches for the routes passing through the plurality of nodes present in each sub-area. Then, the candidate route/time creation section 52 determines the basic route and the route other than the basic route among the retrieved routes. The candidate route/time creation section 52 outputs the basic route and the route other than the basic route determined for each sub-area as route data Ri (i=0, . . . , N) to a data output section 53.

The candidate route/time creation section 52 determines time required when the on-demand bus 10 travels on each determined basic route, and adjustment time required when the on-demand bus 10 travels on each determined route other than the basic route. In this case, the candidate route/time creation section 52 determines required time and (or) adjustment time for each divided sub-area (block). Now, this processing is specifically described referring to FIG. 6.

First, determination of required time is described. The candidate route/time creation section 52 determines, by using the map information (map data), the congestion information, and the weather information acquired from the operation database 21e via the data input section 51, time required when the on-demand bus 10 travels on the basic route determined for each sub-area. In other words, the candidate route/time creation section 52 determines required time changeable depending on a day of the week, a time slot, or a weather and based on the magnitude of the demand and a land use situation that are varied from one sub-area to another (that is, features of each sub-area).

To specifically describe the exemplary case illustrated in FIG. 6, first, in the sub-area A, the candidate route/time creation section 52 determines, based on the map information (i.e., land use situation), the congestion information, and the weather information, time required from the node 1 that is a point of departure of the basic route A100 to the node 3 to be 10 minutes, and time required from the node 3 to the node 1001 to be 7 minutes. Similarly, in the sub-area B, the candidate route/time creation section 52 determines time required from the node 1001 that is a point of departure of the basic route B100 to the node 4 to be 8 minutes, time required from the node 4 to the node 5 to be 7 minutes, and time required from the node 5 to the node 1002 to be 2 minutes.

On the other hand, when a route other than the basic route is retrieved, the candidate route/time creation section 52 determines adjustment time for each sub-area. In other words, the candidate route/time creation section 52 determines, with respect to the time required when the on-demand bus 10 travels on the basic route, adjustment time required for the on-demand bus 10 to pass through a via point on the route other than the basic route for each sub-area.

To specifically describe the exemplary case illustrated in FIG. 6, as described above, in the sub-area A, with respect to the basic route A100, the route A110 other than the basic route, which branches from the basic route A100 to pass through the node 2, has been retrieved. In this case, the candidate route/time creation section 52 determines, based on the map information (i.e., land use situation), the congestion information, and the weather information, time required from the node 1 that is the point of departure of the basic route A100 (route A110 other than basic route) to the node 2 to be 10 minutes, and determines, as adjustment time for the sub-area A, 5 minutes required for the on-demand bus 10 to make a round trip to the node 2 when the on-demand bus 10 travels from the basic route A100 through the node 2 to the node 3. In other words, the candidate route/time creation section 52 determines, without specifying the node 2 that is a location branching from the basic route A100, time required for (added to) the required time to pass through the branch location (5 minutes required for the round trip to the node 2 in the example illustrated in FIG. 6) as adjustment time for the sub-area A.

On the other hand, in FIG. 6, as described above, no route other than the basic route has been determined in the sub-area B. Accordingly, the candidate route/time creation section 52 does not determine any adjustment time for the sub-area B. Thus, after the required time and (or) the adjustment time have been determined for each sub-area, the candidate route/time creation section 52 outputs required time Tj (j=0, M) from the node that is the point of departure to each node in each sub-area and the adjustment time corresponding to each sub-area to the data output section 53.

The data output section 53 acquires route data Ri (i=0, N) determined for each sub-area, the required time Tj (j=0, M), and the adjustment time of each sub-area output from the candidate route/time creation section 52. Then, the data output section 53 outputs the route data Ri (i=0, N), the required time Tj (j=0, M), and the adjustment time of each sub-area that have been acquired to the operation database 21e. Accordingly, at a predetermined storage location of the operation database 21e, the required time and the adjustment time for the basic route and the route other than the basic route of each sub-area are stored as a searchable information table. To describe a specific example, as illustrated in FIG. 7, the operation database 21e stores, for the basic route A100 of the sub-area A and the basic route B100 of the sub-area B, each node No. and required time in a corresponding manner. For the route A100 other than the basic route of the sub-area A, the operation database 21e stores each node No. and required time in a corresponding manner, and stores the adjustment time (5 minutes) of the sub-area A as indicated by the boldface.

In the sub-area A, 5 minutes have been determined as the adjustment time. Thus, needless to say, in accordance with a user's demand (request) or based on past track record, for example, when the on-demand bus 10 passes through the node 2, the required time to the node 3 is 15 minutes after addition of 5 minutes, and the required time to the node 1001 is 22 minutes after addition of 5 minutes.

Next, the reservation reception processing section 60 is described. As illustrated in FIG. 5, the reservation reception processing section 60 includes a data input section 61. The data input section 61 acquires, from the demand database 21d, reservation information (demand information) stored in a predetermined storage location of the database 21d in an updatable manner to input the information. The data input section 61 supplies the input reservation information (demand information) to an operation plan candidate creation section 62. Further, the data input section 61 acquires and inputs, from the operation database 21e, the route data Ri, the required time Tj, and the adjustment time stored in the predetermined storage location of the operation database 21e. Then, the data input section 61 supplies the route data Ri, the required time Tj, and the adjustment time to the operation plan candidate creation section 62.

Here, transmission of the reservation information (demand information) carried out by the user is described. The user wishing to use the on-demand bus 10 can transmit the reservation information (demand information) to the operation management center 20 by using his/her own information terminal device 30, and can also transmit the reservation information (demand information) to an operator resident in the operation management center 20 through a voice call by using a fixed-line phone placed at home, for example. Now, mainly, a case where the reservation information (demand information) is transmitted (communicated) by using the information terminal device 30 is described.

When the user uses the information terminal device 30 to transmit the reservation information (demand information) to the operation management center 20, the user activates, for example, a predetermined application program provided from the operation management center 20 in order to transmit the reservation information (demand information) on the information terminal device 30. Then, the user inputs, by using the input unit 31 of the information terminal device 30 and in accordance with the predetermined application program, desired boarding/drop-off location information, desired time information, and boarding/drop-off status information as reservation information (demand information), that is, a request. As the boarding/drop-off status information, for example, for desired time T, "T−15 (minutes)" is input when "arrival by desired time T" is desired, "T+15 (minutes)" is input when "departure at desired time T" is desired, and "T−15 (minutes)" and "T+15 (minutes)" are input when "arrival by (departure at) around desired time T" is desired. "T−30 (minutes)" and "T+30 (minutes)" are input when there is no particular desire. When the reservation information (demand information) is input in this manner, the electronic control unit 33 of the information terminal device 30 transmits the input reservation information (demand information) and the user identification information stored in the storage unit 34 to the operation management center 20 via the communication unit 35.

On the operation management center 20, the control device 21a of the server 21 uses the communication device 22 to acquire and receive the reservation information (demand information) and the user identification information transmitted from the information terminal device 30 of the user. Then, the control device 21a inputs each corresponding item of the received reservation information (demand information) to the reservation information table, which is provided in advance and includes at least the desired boarding/drop-off location indicated by the desired boarding/drop-off location information, the desired boarding (and/or drop-off) time indicated by the desired time information, and the added time indicated by the boarding/drop-off status information as input items. When each item of the reservation information table is input based on the received reservation information (demand information), the control device 21a stores the reservation information table and the received user identification information in a predetermined storage location of the demand database 21d in association with each other in a searchable manner. In this case, for example, when the user's home is designated as the desired boarding/drop-off location, the control device 21a stores the user's home address and the like registered in the demand database 21d in advance in association with the reservation information table.

Note that, when the user conveys the reservation information (demand information) to the operator of the operation management center 20 in the form of, for example, a call, the operator first acquires and receives the user's full name and the reservation information (demand information), namely, the desired boarding/drop-off location information, the desired time information, and the boarding/drop-off status information, from the user in the form of a call. Then, although not shown, the operator uses an input unit (for example, keyboard) provided to the operation management center 20 to input each item of the received reservation information (demand information) to the control device 21a. Further, the operator uses the acquired user's full name to acquire the user identification information registered in advance, and inputs the user identification information to the control device 21a. Accordingly, the control device 21a stores the reservation information table on which each item input by the operator has been reflected and the input user identification information in a predetermined storage location of the demand database 21d in association with each other in a searchable manner.

Here, in a case where the user uses the on-demand bus 10, as described later, the operation management center 20 (more specifically, server 21) determines the operation plan and thus needs a certain amount of time period. For this reason, the server 21 (control device 21a) is configured to transmit the decline information to the user if a time period from the current time until, at least, the desired boarding time or the desired drop-off time indicated by the desired time information (that is, desired time) is designated so as to be equal to or smaller than a predetermined time period when the reservation information (demand information) is acquired. In other words, the server 21 (control device 21a) is configured to keep receiving the reservation information (demand information) until at least a time point when the predetermined time period can be secured, and to stop receiving the reservation information (demand information) after a time point when the predetermined time period cannot be secured.

The operation plan candidate creation section 62 creates, by using the reservation information (demand information), the route data Ri (i=0, . . . , N), the required time Tj (j=0, . . . , M), and the adjustment time acquired via the data input unit 61, an operation plan candidate corresponding to the user who has transmitted the reservation information (demand information). Specifically, the operation plan candidate creation section 62 sequentially acquires the retrieved route data Ri (i=0, . . . , N), and determines whether or not the on-demand bus 10 can pass through a desired boarding/drop-off location demanded (requested) by the user in the acquired route data Ri (i=0, . . . , N). In addition, the operation plan candidate creation section 62 determines, in accordance with the required time Tj (j=0, . . . , M) determined in the acquired route data Ri (i=0, . . . , N), whether or not the on-demand bus 10 can operate between the desired boarding/drop-off locations at desired boarding/drop-off time and added time. Then, the operation plan candidate creation section 62 creates, as an operation plan candidate, route data and required time enabling an operation passing through the desired boarding/drop-off location at the desired boarding/drop-off time (desired time) that takes into account the added time, that is, a candidate route and operation time.

Figure 8:
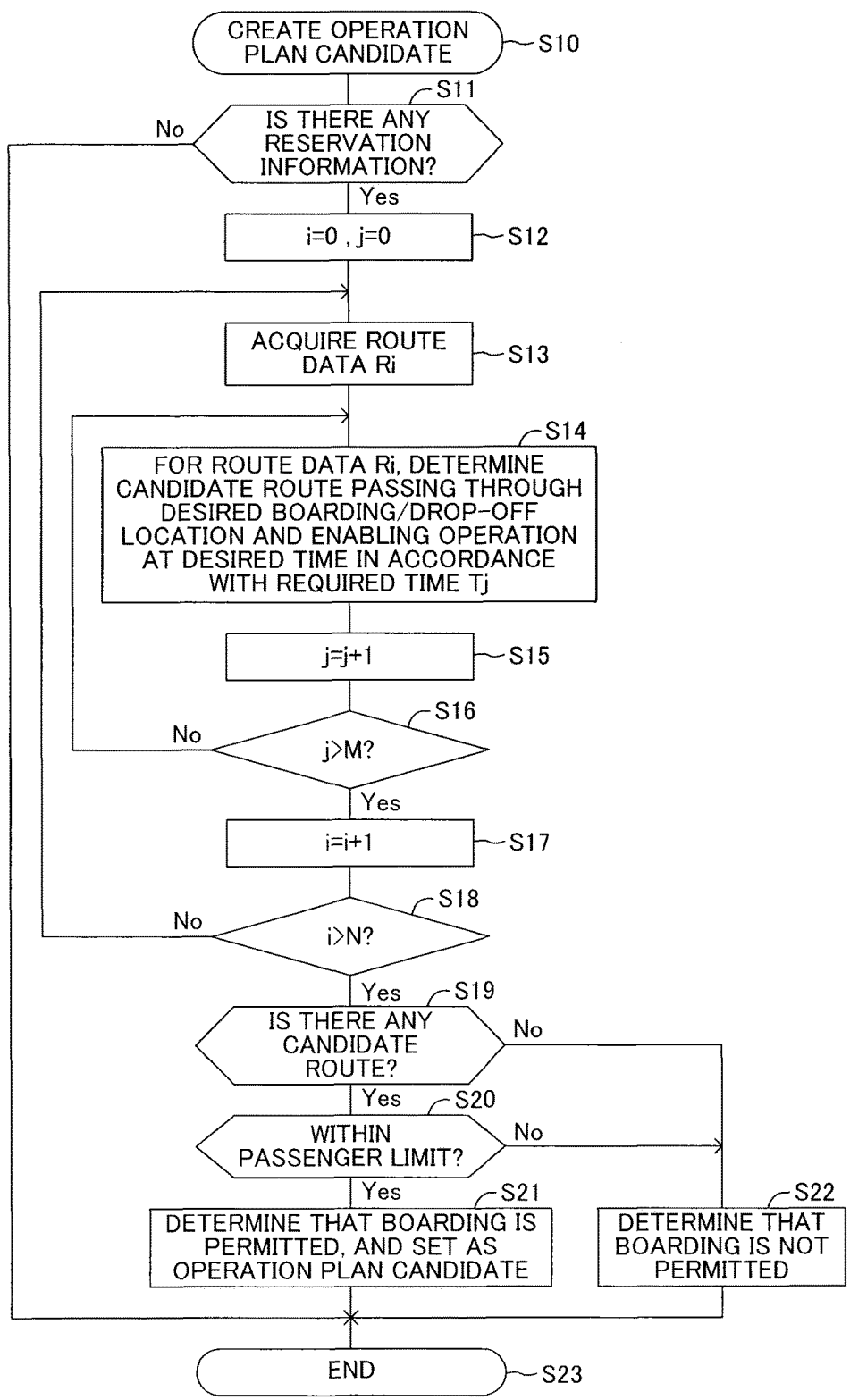
FIG. 8 is a flowchart of an operation plan candidate creation program executed by an operation plan candidate creation section (CPU) of a reservation reception processing section illustrated in FIG. 5.

Therefore, the operation plan candidate creation section 62 (more specifically, CPU of control device 21a) executes an operation plan candidate creation program following a flowchart illustrated in FIG. 8. Now, each processing step based on the operation plan candidate creation program is described.

In Step S10, the operation plan candidate creation section 62 (more specifically, CPU of control device 21a, and thus simply referred to as "CPU" hereinafter) starts execution of the operation plan candidate creation program. In Step S11, the CPU determines whether or not reservation information (demand information) has been transmitted from the user. Specifically, when the reservation information table stored in the predetermined storage location of the demand database 21d has been updated, it means that reservation information (demand information) has been transmitted from the user. Thus, the CPU determines "Yes", and proceeds to Step S12. On the other hand, when the reservation information table has not been updated, it means that no reservation information (demand information) has been transmitted from the user. Thus, the CPU determines "No", and proceeds to Step S23 to temporarily end the execution of the program. After the passage of a predetermined short period of time, in Step S10, the CPU starts execution of the operation plan candidate creation program again.

In the processing of Steps S12 to S19, the CPU determines whether or not each of a plurality of pieces of route data Ri (i=0, . . . , N) and required time Tj (j=0, . . . , M) in the route data Ri (i=0, . . . , N) created by the candidate route/time creation section 52 of the route data creation section 50 satisfies the reservation information (demand information), that is, the request, transmitted from the user. In other words, the CPU determines whether or not there is a candidate route and operation time enabling an operation of the on-demand bus 10 while satisfying the reservation information (demand information) desired by the user, namely, an operation plan candidate.

Specifically, in Step S12, the CPU resets both a number i for identifying the route data Ri and a number j for identifying the required time Tj to "0". Then, the CPU proceeds to Step S13. In Step S13, the CPU sequentially acquires the route data Ri input from the operation database 21e by the data input section 61 from the number i="0". Then, the CPU proceeds to Step S14.

In Step S14, first, for the route data Ri acquired in Step S13, the CPU determines whether or not the on-demand bus 10 passes through a desired boarding/drop-off location desired by the user when the on-demand bus 10 travels on a route represented by the acquired route data Ri. Then, for the route data Ri passing through the desired boarding/drop-off location, the CPU sequentially acquires the required time Tj determined corresponding to the route data Ri from the number j="0". Then, the CPU determines, when the on-demand bus 10 travels on the route represented by the route data Ri in accordance with the required time Tj, whether or not the operation can be made so that the on-demand bus 10 can depart from or arrive at the desired boarding/drop-off location desired by the user at desired boarding/drop-off time that is desired time or time acquired by adding an additional time to the desired boarding/drop-off time.

After the operable state of the on-demand bus 10 using the required time Tj has been determined in this way, the CPU proceeds to Step S15 to increment the number j of the required time Tj by "1". Then, in Step S16, the CPU can determine, by repeatedly determining "No" until the number j of the required time Tj is higher than "M" that is a final number, whether or not the on-demand bus 10 can operate in accordance with the required time Tj (j=0, . . . , M), which is determined in Step S14 and corresponds to the route data Ri acquired in Step S13.

On the other hand, in Step S16, when the number j of the required time Tj is higher than "M" that is the final number, the CPU determines "Yes", and proceeds to Step S17 to increment the number i of the route data Ri by "1". Then, in Step S18, the CPU can determine, by repeatedly determining "No" until the number i of the route data Ri is higher than "N" that is a final number, whether or not the on-demand bus 10 can operate in accordance with the required time Tj (j=0, . . . , M), which is determined in Step S14 and corresponds to the route data Ri sequentially acquired in Step S13.

In Step S18, when the number i of the route data Ri is higher than "N" that is the final number, the CPU determines "Yes", and proceeds to Step S19. In other words, when "Yes" is determined in Step S18, it means that, for all the currently retrieved route data Ri (i=0, N) and all the required time Tj (j=0, M) corresponding to the route data Ri (i=0, N), it is determined whether or not the on-demand bus 10 can operate while satisfying the reservation information (demand information) transmitted from the user. Thus, in Step S19, by executing the processing of Steps S13 to S18, the CPU determines whether or not there is any route data Ri, that is, any candidate route, enabling the on-demand bus 10 to operate while satisfying a demand (request) included in the reservation information (demand information) transmitted from the user.

Specifically, when a candidate route is present, the CPU determines "Yes", and proceeds to Step S20. On the other hand, when no candidate route is present, the CPU determines "No", and proceeds to Step S22. In Step S22, because there is no candidate route satisfying the user's demand (request), the CPU determines that the user is not permitted to board the on-demand bus 10. Then, the CPU proceeds to Step S23 to temporarily end the execution of the operation plan candidate creation program. After the passage of a predetermined short period of time, in Step S10, the CPU starts execution of the program again.

In Step S20, when the user who has transmitted the reservation information (demand information) this time is permitted to board the bus, the CPU determines whether or not there is any room in a passenger limit (the number of passengers supposed to board falls within passenger limit) of the on-demand bus 10 that travels on the candidate route. Specifically, when there is room in the passenger limit of the on-demand bus 10 that travels on the candidate route, thus permitting the user to board the bus, the CPU determines "Yes", and proceeds to Step S21. On the other hand, when there is no room in the passenger limit of the on-demand bus 10 that travels on the candidate route, thus inhibiting the user from boarding the bus, the CPU determines "No", and proceeds to Step S22. Then, in Step S22, the CPU determines that the user is not permitted to board the on-demand bus 10. Then, the CPU proceeds to Step S23, and temporarily ends the execution of the operation plan candidate creation program. After the passage of a predetermined short period of time, in Step S10, the CPU starts execution of the program again.

In Step S21, the CPU determines that the user who has transmitted the reservation information (demand information) this time is permitted to board the on-demand bus 10, and determines the candidate route (route data Ri) and operation time (required time Tj) for operating the on-demand bus 10 as an operation plan candidate. After the operation plan candidate has been determined in this way, the CPU proceeds to Step S23 to temporarily end the execution of the operation plan candidate creation program. After the passage of a predetermined short period of time, in Step S10, the CPU starts execution of the program again.

In this manner, the CPU executes the operation plan candidate creation program to determine the operation plan candidate, and determine whether or not the user is permitted to board the on-demand bus 10. Then, the operation plan candidate creation section 62 outputs operation plan candidate information indicating the operation plan candidate determined corresponding to the user who has transmitted the reservation information (demand information) this time to the data output section 63. Note that, the operation plan candidate creation section 62 also outputs boarding permission/inhibition information indicating boarding permission/inhibition on the on-demand bus 10 to the data output section 63.

The data output section 63 acquires the operation plan candidate information and the boarding permission/inhibition information output from the operation plan candidate creation section 62. Then, the data output section 63 outputs the acquired operation plan candidate information to the operation database 21e. Accordingly, the operation plan candidate information corresponding to the user who has transmitted the reservation information (demand information) this time is accumulated and stored in a predetermined storage location of the operation database 21e in a searchable manner. Further, the data output section 63 outputs the acquired boarding permission/inhibition information to the demand database 21d. Accordingly, the boarding permission/inhibition information is stored in a predetermined storage location of the demand database 21d in association with the user who has transmitted the reservation information (demand information) this time. Therefore, when it is determined that the user is not permitted to board the on-demand bus 10 based on the stored boarding permission/inhibition information, the server 21 (control device 21a) can transmit decline information to the user by using the communication device 22.

Next, the operation plan determination processing section 70 is described. As illustrated in FIG. 5, the operation plan determination processing section 70 includes a data input section 71. The data input section 71 acquires, from the demand database 21d, reservation information (demand information) of a plurality of users accumulated and stored in a predetermined storage location of the database 21d until an operation day to input the information. The data input section 71 supplies the input reservation information (demand information) of the plurality of users to an adjustment time setting/plan determination section 72. Further, the data input section 71 acquires and inputs, from the operation database 21e, operation plan candidate information, and bus information indicating the bus identification information, the number of buses, and the capacity of the operable on-demand bus 10 that are accumulated and stored in a predetermined storage location of the database 21e. Then, the data input section 71 supplies the operation plan candidate information and the bus information that have been input to the adjustment time setting/plan determination section 72.

Figure 9:
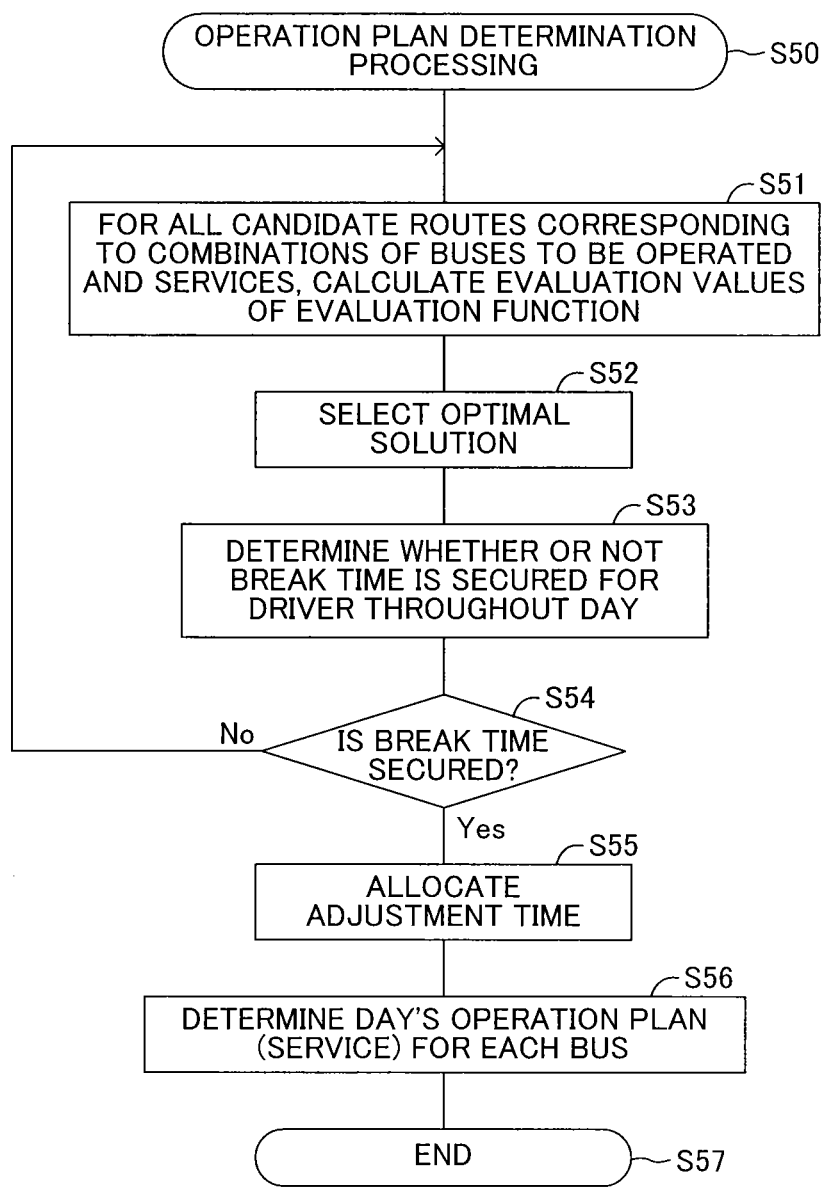
FIG. 9 is a flowchart of an operation plan determination processing program executed by an adjustment time setting/plan determination section (CPU) of an operation plan determination processing section illustrated in FIG. 5.

The adjustment time setting/plan determination section 72 determines, by using the reservation information (demand information) of the plurality of users, the operation plan candidate information, and the bus information that have been acquired via the data input section 71, an operation plan that satisfies demands (requests) of the plurality of users to be board the on-demand bus 10. To this end, the adjustment time setting/plan determination section 72 (more specifically, CPU of control device 21a) executes an operation plan determination processing program following a flowchart illustrated in FIG. 9. Now, each processing step based on the operation plan determination processing program is described.

In Step S50, the adjustment time setting/plan determination section 72 (more specifically, CPU of control device 21a, and thus simply referred to as "CPU" hereinafter) starts execution of the operation plan determination program. Then, in Step S51, the CPU calculates, for all pieces of operation plan information (i.e., candidate route and operation time) each corresponding to a combination of the on-demand bus 10 to be operated and services to be provided for transporting the users to satisfy their demands (requests), evaluation values of an evaluation function that is a predetermined evaluation expression.

Specifically, the CPU employs, as a predetermined evaluation expression, an evaluation function in which evaluation items include a difference in desired boarding/drop-off time (desired time) of each user, a travelling distance of the on-demand bus 10, and adjustment time determined for each sub-area, and a constraint is a time period (longest time) for each service. The difference in desired boarding/drop-off time (desired time) of each user as one of the evaluation items is determined based on desired boarding/drop-off time indicated by the reservation information (demand information) and operation time indicated by the operation plan candidate information. The travelling distance of the on-demand bus 10 as one of the evaluation items is determined based on a desired boarding/drop-off location indicated by the reservation information (demand information), a candidate route indicated by the operation plan candidate information, and the capacity of the on-demand bus 10 (whether or not many users can be transported at once) indicated by the bus information. Further, the adjustment time determined for each sub-area as one of the evaluation items is determined based on adjustment time in association with the candidate route and the operation time indicated by the operation plan candidate information.

Then, the CPU appropriately sets weights for the evaluation items by, for example, a known calculation method, and calculates, for all candidate routes indicated by all the pieces of operation plan candidate information, evaluation values of the evaluation function in which the evaluation items include the difference in desired boarding/drop-off time (desired time) of each user, the travelling distance, and the adjustment time. After the evaluation values of the evaluation function have been calculated in this way, the CPU proceeds to Step S52. In Step S52, based on the evaluation values calculated in Step S51, the CPU selects an optimal solution of, for example, an evaluation function in which the evaluation values are largest or smallest, specifically, the difference in desired boarding/drop-off time (desired time) of each user is smallest, the travelling distance is smallest, and further the adjustment time is longest. Then, after the optimal solution of the evaluation function is selected, that is, after a candidate route appropriately satisfying the demands (requests) of the plurality of users, namely, an operation plan candidate including an operation route and operation time corresponding to the operation route is selected, the CPU proceeds to Step S53.

In Step S53, the CPU determines, based on the operation plan candidate selected in Step S52, whether or not break time is secured for the driver throughout the day. Specifically, the CPU determines whether or not time between the operation plan candidates, that is, between services in which the driver operates the on-demand bus 10, is equal to or longer than time set in advance as break time. Specifically, for example, a case is assumed where a service A (operation plan candidate) provided in the morning and a service B (operation plan candidate) provided in the afternoon are selected. In this state, when the service A ends its operation to return at 12:00 and the service B starts its operation at 13:00, a spare time of 1 hour is present between the services A and B. In this case, for example, when 1 hour is set as a lunch break, the CPU determines that the spare time of 1 hour is secured as lunch break time. On the other hand, when the service A ends its operation to return at 12:00 and the service B starts its operation at 12:30, a spare time of 30 minutes is present between the services A and B. In this case, the CPU determines that this spare time of 30 minutes does not correspond to time space secured as lunch break time.

After whether or not break time is secured has been determined in this way, the CPU proceeds to Step S54. When it is determined in Step S53 that break time is secured for the driver, the CPU determines "Yes", and proceeds to Step S55. On the other hand, when it is determined in Step S53 that no break time is secured for the driver, the CPU determines "No", and returns to Step S51. Then, the CPU executes the processing of Steps S51 to S53 again, and continuously and repeatedly determines "No" in Step S54 until break time is secured for the driver.

In Step S55, the CPU allocates the adjustment time that corresponds to the operation plan candidates selected in Step S52, more specifically, the candidate routes (operation routes), and is determined for each sub-area. Specifically, for example, the CPU refers, among the pieces of past reservation information (demand information) accumulated and stored in the predetermined storage location of the demand database 21d, namely, the past track record, to the past reservation information (demand information) of the same time slot and the same sub-area as those of a request indicated by current reservation information (demand information). When there is a node (location) that is not passed through in a currently selected operation plan candidate but is frequently passed through in the past track record, the CPU assumes passage through this node (location), and takes into account (allocates) the determined adjustment time in the operation time of the operation plan candidate. In other words, when a node (location) that needs to be passed through (or preferably passed through) is selected rather than taking into account all the adjustment time determined for each sub-area in the operation time of the operation plan candidate, the CPU assumes passage through this selected node (location), and appropriately increases/decreases the determined adjustment time to take into account (allocate) the adjustment time in the operation time of the operation plan candidate. After the adjustment time determined for each sub-area has been allocated in this way, the CPU proceeds to Step S56.

In Step S56, the CPU determines, as a final operation plan (service) per day for each on-demand bus 10, the operation plan candidate that has taken into account (is allocated) the adjustment time in Step S55 in the operation plan candidate selected in Step S52. Then, after the operation plan (service) per day has been determined, the CPU proceeds to Step S57 to end the execution of the operation plan determination processing program.

After the operation plan (service) has been determined in this way by executing the operation plan determination processing program, the adjustment time setting/plan determination section 72 outputs operation plan information indicating the operation plan and bus identification information of an on-demand bus 10 operated in accordance with the operation plan in association with each other to the data output section 73. The data output section 73 acquires the operation plan information and the bus identification information output from the adjustment time setting/plan determination section 72. Then, the data output section 73 outputs the operation plan information and the bus identification information that have been acquired to the operation database 21e. Accordingly, in a predetermined storage location of the operation database 21e, the operation plan information per day for each on-demand bus 10 is stored in a searchable manner.

After the operation plan information has been stored in the predetermined storage location of the operation database 21e, the server 21 (control device 21a) transmits, to the user who has transmitted the reservation information (demand information), suitable operation plan information, namely, service information, for boarding (or dropping off) the on-demand bus 10 at a desired boarding/drop-off location and desired time by using the communication device 22. Accordingly, the user can grasp the operation plan of the on-demand bus 10 by confirming the service information received via, for example, the information terminal device 30, and use the on-demand bus 10 at the desired boarding/drop-off location and the desired time.

Next, the additional reservation reception processing section 80 is described. As illustrated in FIG. 5, the additional reservation reception processing section 80 includes a data input section 81. The data input section 81 acquires, from the demand database 21d, additional reservation information (additional demand information) stored in a predetermined storage location of the database 21d on an operation day after the operation plan has been determined by the operation plan determination processing section 70 to input the information. The data input section 81 supplies the input additional reservation information (additional demand information) to a demand addition processing section 82. Further, the data input section 81 acquires and inputs, from the operation database 21e, operation plan information and bus identification information stored in a predetermined storage location of the database 21e. Then, the data input section 81 supplies, to the demand addition processing section 82, the operation plan information and the bus identification information that have been input.

Figure 10:
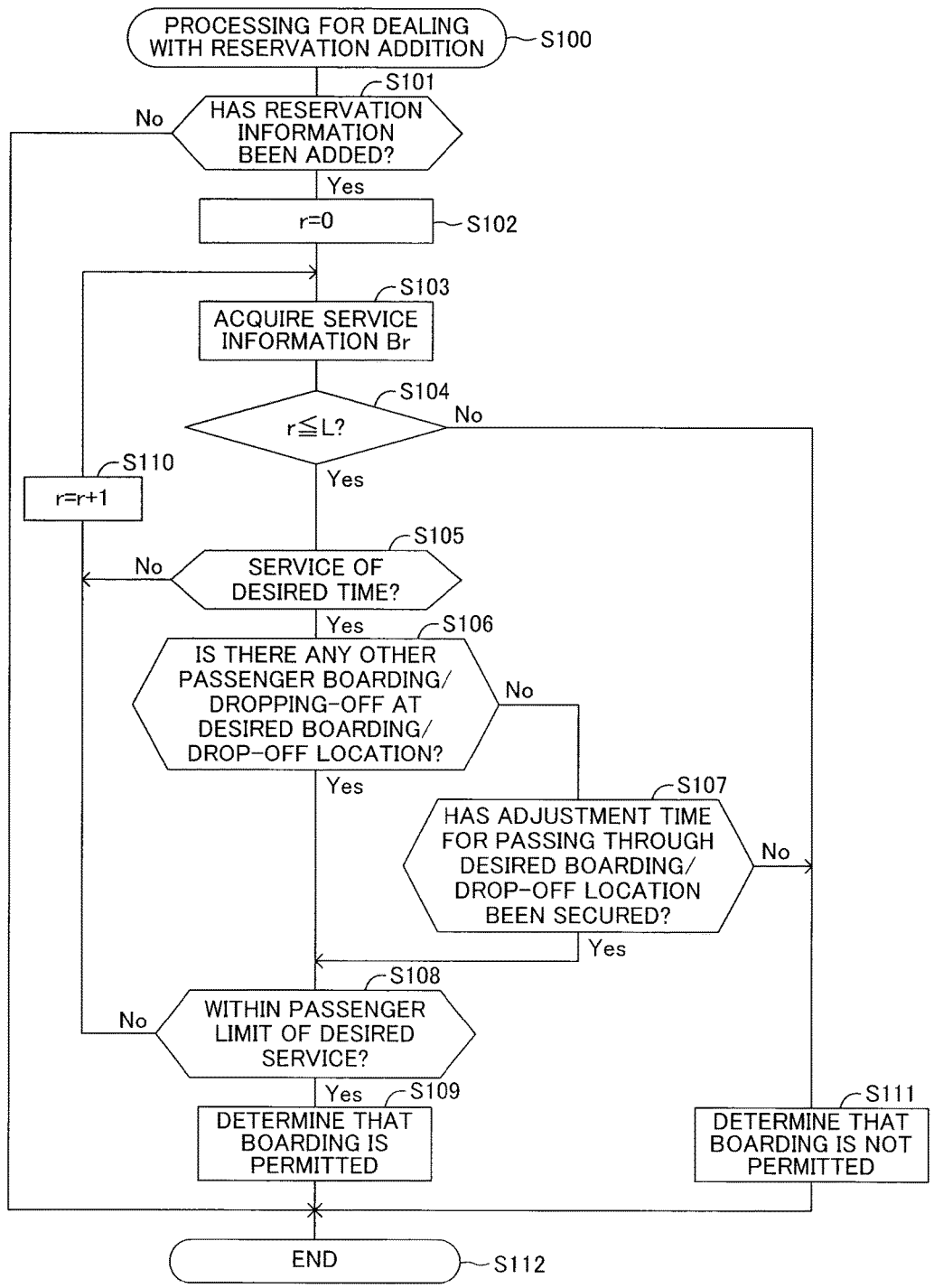
FIG. 10 is a flowchart of a processing program for dealing with reservation addition executed by a demand addition processing section (CPU) of an additional reservation reception processing section illustrated in FIG. 5.

The demand addition processing section 82 determines whether or not additional reservation is acceptable after the operation plan has already been determined by the operation plan determination processing section 70. To this end, the demand addition processing section 82 (more specifically, CPU of control device 21a) executes a processing program for dealing with reservation addition following a flowchart illustrated in FIG. 10. Now, each processing step based on the processing program for dealing with reservation addition is described.

In Step S100, the demand addition processing section 82 (more specifically, CPU of control device 21a, and thus simply referred to as "CPU" hereinafter) starts execution of the processing program for dealing with reservation addition. In Step S101, the CPU determines whether or not reservation information (demand information) has been added from the user. Specifically, when the reservation information table stored in the predetermined storage location of the demand database 21d has been updated based on the additional reservation information (additional demand information), it means that reservation information (demand information) has been added from the user. Thus, the CPU determines "Yes", and proceeds to Step S102. On the other hand, when the reservation information table has not been updated, it means that no reservation information (demand information) has been added from the user. Thus, the CPU determines "No", and proceeds to Step S112 to temporarily end the execution of the program. After the passage of a predetermined short period of time, in Step S100, the CPU starts execution of the processing program for dealing with reservation addition again.

In Step S102, the CPU resets a number r to "0", which is used to identify an operation plan per day indicated by the operation plan information determined by the operation plan determination processing section 70, that is, service information Br (r=0, . . . , L) indicating each service for operating the on-demand bus 10 a day. Then, in Step S103, the CPU sequentially acquires the operation plan information input from the operation database 21e by the data input section 81, that is, the service information Br, from the number r="0". Then, the CPU proceeds to Step S104.

In Step S104, the CPU determines whether or not the number r of the service information Br acquired in Step S103 is equal to or lower than "L" indicating a final service. Specifically, when the number r is equal to or lower than "L", that is, the acquired service information Br is service information up to the final service, the CPU determines "Yes", and proceeds to Step S105. On the other hand, when the number r is higher than "L", that is, the acquired service information Br is service information after the final service of the day, the CPU determines "No", and proceeds to Step S111 described below.

In Step S105, the CPU determines, based on the desired time information included in the additional reservation information (additional demand information) input by the data input section 81, whether or not the service information Br acquired in Step S103 is a service matching desired boarding/drop-off time (desired time). Specifically, when the acquired service information Br is a service matching the user's desired boarding/drop-off time (desired time), the CPU determines "Yes", and proceeds to Step S106. On the other hand, when the service information Br acquired in Step S103 is a service not matching the desired boarding/drop-off time (desired time), the CPU determines "No", and proceeds to Step S110 described below.

In Step S106, the CPU determines, based on the desired boarding/drop-off location information included in the additional reservation information (additional demand information) input by the data input section 81, whether or not there is any other passenger (user) intending to board (or drop off) the on-demand bus 10 at the user's desired boarding/drop-off location, which is operated based on the service information Br (hereinafter referred to as "desired service information Br") determined to match the user's desired boarding/drop-off time (desired time) in Step S105. Specifically, when there is any other passenger (user) intending to board (or drop off) at the user's desired boarding/drop-off location, the CPU determines "Yes", and proceeds to Step S108. On the other hand, when there is no other passenger (user) intending to board (or drop off) at the user's desired boarding/drop-off location, the CPU determines "No", and proceeds to Step S107.

In Step S107, the CPU determines whether or not adjustment time necessary for passing through the user's desired boarding/drop-off location has been secured (allocated) for the operation route and the operation time indicated by the desired service information Br. Specifically, when adjustment time necessary for passing through the user's desired boarding/drop-off location has been secured (taken into account) in the operation route and the operation time, the CPU determines "Yes", and proceeds to Step S108. Here, in order to pass through the desired boarding/drop-off location of the user who has transmitted the additional reservation information (additional demand information), the CPU changes the operation route by using the adjustment time that has been secured (taken into account).

In Step S108, the CPU determines whether or not there is any room in a passenger limit (the number of the passengers supposed to board falls within passenger limit) of the on-demand bus 10 that travels in accordance with the desired service information Br. Specifically, when there is room in the passenger limit of the on-demand bus 10 that travels in accordance with the desired service information Br, thus permitting the user who has transmitted the additional reservation information (additional demand information) to board the bus, the CPU determines "Yes", and proceeds to Step S109. Then, in Step S109, the CPU determines that the user is permitted to board the on-demand bus 10. Then, in Step S112, the CPU temporarily ends the execution of this program. On the other hand, when there is no room in the passenger limit of the on-demand bus 10 that travels in accordance with the desired service information Br, thus inhibiting the user who has transmitted the additional reservation information (additional demand information) from boarding the bus, the CPU determines "No", and proceeds to Step S110. Then, in Step S110, the CPU increments the number r of the service information Br by "1". Then, in Step S103, the CPU acquires next service information Br.

When adjustment time necessary for passing through the user's desired boarding/drop-off location has not been secured (taken into account) in the operation route and the operation time in Step S107, the CPU determines "No", and proceeds to Step S111. In Step S111, the CPU determines that the user is not permitted to board the on-demand bus 10, because it is determined that there is no service of the on-demand bus 10 permitting the user to board the bus based on the determination processing in Step S104, or that the on-demand bus 10 that travels in accordance with the desired service information Br does not pass through the desired boarding/drop-off location based on the determination processing in Step S107. Then, the CPU proceeds to Step S112 to temporarily end the execution of the processing program for dealing with the reservation addition. After the passage of a predetermined short period of time, in Step S100, the CPU starts execution of the same program again.

After the processing program for dealing with the reservation addition is executed as described above, the desired service information Br is determined, and permission or inhibition of boarding to the on-demand bus 10 operated based on the desired service information Br is determined, the demand addition processing section 82 outputs the desired service information Br and the boarding permission/inhibition information indicating permission or inhibition of boarding to the on-demand bus 10 to a data output section 83. Then, the data output section 83 acquires the desired service information Br and the boarding permission/inhibition information output from the demand addition processing section 82. Then, the data output section 83 outputs, to the operation database 21e, the desired service information Br and the boarding permission/inhibition information that have been acquired. Accordingly, in a predetermined storage location of the operation database 21e, the desired service information Br reflecting the determination on the transmitted additional reservation information (additional demand information) made this time, that is, the operation plan information and the boarding permission/inhibition information that have been adjusted (changed), are stored in a searchable manner.

Thus, the server 21 (control device 21a) transmits, to the user who has transmitted the additional reservation information (additional demand information), the desired service information Br by using the communication device 22. Accordingly, the user can grasp the operation plan of the on-demand bus 10 by confirming the desired service information Br received via, for example, the information terminal device 30, and use the on-demand bus 10 at the desired boarding/drop-off location and the desired time. In addition, for example, when the operation route is slightly changed in order to pass through the boarding/drop-off location desired by the user who has added the reservation information (demand information), the server 21 (control device 21a) can also notify the change to the user to whom the operation plan information, namely, the service information, has been transmitted. Further, the server 21 (control device 21a) can transmit, when it is determined that the user who has transmitted the additional reservation information (additional demand information) is inhibited from boarding the on-demand bus 10 based on the stored boarding permission/inhibition information, decline information to the user by using the communication device 22.

As can be understood from the above description, according to the embodiment, the operation area of the on-demand bus 10 can be divided into the plurality of sub-areas (blocks), and sufficient adjustment time necessary for each sub-area can be set. Therefore, wasteful time (redundant time) in operation can be suppressed, and an operation plan with a high degree of freedom can be determined by using the adjustment time.

In other words, as described above, the adjustment time is set for each sub-area and is different from an adjustment time that is set after a location is specified, which corresponds to time in a case of passing through each specific location in the sub-area, for example. Thus, because the control device 21a appropriately increases or decreases the adjustment time and takes the adjustment time into account to determine an operation plan, even when, for example, the new user sends (transmits) additional reservation information (additional demand information), it is possible to significantly reduce the impact on use of the on-demand bus 10 of another user who has sent (transmitted) the reservation information (demand information) at the point of time of determining the operation plan as long as time required for the on-demand bus 10 to arrive at a boarding/drop-off location desired by the user falls within the adjustment time set for each sub-area where the desired boarding/drop-off location is present. In other words, because the adjustment time can be set for each sub-area, the degree of freedom in an operation plan to be determined can be increased. Thus, even when another request is added to the operation plan that has been determined once, the request can be add with the small impact on the entire operation plan. Therefore, a new operation plan can be quickly determined.

In implementing the present invention, the present invention is not limited to the above-mentioned embodiment, and different kinds of modifications can be made thereto without departing from an object of the present invention.

For example, the above-mentioned embodiment is implemented by assuming the case where after the operation plan has been determined, the new user transmits the additional reservation information (additional demand information) and the new demand (request) is taken into account in the operation plan that has already been determined. In this case, for example, even when the user who has already transmitted the reservation information (demand information) requests a change of the desired boarding/drop-off location or the desired boarding/drop-off time, that is, even when the user adds a new demand (request), needless to say, the operation plan can be adjusted (changed) by taking such a change into account as in the case of the above-mentioned embodiment.

Further, the above-mentioned embodiment is implemented in such a manner that the adjustment time setting/plan determination section 72 of the operation plan determination processing section 70 determines, in principle, the operation plan of the on-demand bus 10 without changing the reservation information (demand information) sent (transmitted) by the user. The embodiment is also implemented in such a manner that the demand addition processing section 82 of the additional reservation reception processing section 80 determines, in principle, the operation plan of the on-demand bus 10 by using the secured adjustment time without changing the additional reservation information (additional demand information) sent (transmitted) by the user after the operation plan is determined.

In this case, for example, when the impact on the adjustment (change) of the operation plan can be reduced more, or when the operation plans (services) can be reduced if a certain user changes the desired boarding/drop-off location or the desired time desired by the user, or the additional time based on the boarding/drop-off status information, the adjustment time setting/plan determination section 72 or the demand addition processing section 82, that is, the control device 21a of the sever 21, can request the user to change the reservation information (demand information) or the additional reservation information (additional demand information). In this case, for example, when the user accepts the request to change the reservation information or the like, benefits such as discounting of a fare for using the on-demand bus 10 can be provided. Thus, through the request to change the reservation information or the like and the determination of the operation plan based on the changed reservation information or the like, the on-demand bus 10 can be efficiently operated in accordance with the operation plan satisfying demands of more users.

In addition, the above-mentioned embodiment is implemented by providing the on-demand vehicle operation management device according to the present invention to the operation management center 20. In this case, the above-mentioned embodiment can be implemented so that, for example, the operation information terminal device 11 (more specifically, electronic control unit 11a) mounted to the on-demand bus 10 and the information terminal device 30 (more specifically, electronic control unit 33) owned by the user realize, separately or in cooperation with each other, functions equivalent to those of the route data creation section 50, the reservation reception processing section 60, the operation plan determination processing section 70, and the additional reservation reception processing section 80. Also in this case, the same effect as in the above-mentioned embodiment can be obtained.

The invention claimed is:

1. An on-demand vehicle operation management device, comprising:
   circuitry configured to determine an operation plan of an on-demand vehicle based on requests received from a plurality of users and manage an operation of the on-demand vehicle in accordance with said determined operation plan, wherein said circuitry is configured to:
   divide an operation area in which said on-demand vehicle operates into a plurality of predetermined sub-areas;
   search for routes on which said on-demand vehicle can travel for said each divided sub-area;
   determine one of said searched routes as a determined route;
   determine whether there is a remote location which is separated from said determined route and is likely to be additionally requested by at least one of said users to pass through;
   store said determined route as a basic route and a time required for said on-demand vehicle to pass through said basic route as a required time when there is no remote location;
   store said determined route as a route other than the basic route and a time including a time required for said on-demand vehicle to pass through said basic route and a predetermined adjustment time that is a time required for said on-demand vehicle to pass through said remote location when traveling on said determined route as the required time when there is said remote location; and
   determine one of said basic route and said route other than the basic route as said operation plan based on the requests and the required time.

2. An on-demand vehicle operation management device according to claim 1, wherein said circuitry is further configured to change, when receiving an additional request after said operation plan has been determined, said operation plan using said predetermined adjustment time so as to allow said on-demand vehicle to pass through desired boarding/drop-off locations requested by said additional request and allow said on-demand vehicle to operate at a desired time requested by said additional request.

3. An on-demand vehicle operation management device according to claim 1, wherein said circuitry is further configured to determine said operation plan so as to allow break time to be secured for a driver of said on-demand vehicle.

4. An on-demand vehicle operation management method for determining, through a computer device, an operation plan of an on-demand vehicle based on requests received from a plurality of users and managing an operation of said on-demand vehicle in accordance with said determined operation plan, the method comprising:
   dividing an operation area in which said on-demand vehicle operates into a plurality of predetermined sub-areas;
   searching for routes on which said on-demand vehicle can travel for said each divided sub-area;
   determining one of said searched routes as a determined route;
   determining whether there is a remote location which is separated from said determined route and is likely to be additionally requested by at least one of said users to pass through;
   storing said determined route as a basic route and a time required for said on-demand vehicle to pass through said basic route as a required time when there is no remote location;
   storing said determined route as a route other than the basic route and a time including a time required for said on-demand vehicle to pass through said basic route and a predetermined adjustment time that is a time required for said on-demand vehicle to pass through said remote location when traveling on said determined route as the required time when there is said remote location; and
   determining one of said basic route and said route other than the basic route as said operation plan based on the requests and the required time.

5. An on-demand vehicle operation management method according to claim 4, further comprising changing, when receiving an additional request after said operation plan has been determined, said operation plan using said predetermined adjustment time so as to allow said on-demand vehicle to pass through desired boarding/drop-off locations requested by said additional request and allow said on-demand vehicle to operate at a desired time requested by said additional request.

6. An on-demand vehicle operation management method according to claim 4, further comprising determining said operation plan so as to allow break time to be secured for a driver of said on-demand vehicle.

7. An on-demand vehicle operation management system, comprising:
- an on-demand vehicle to be boarded by a plurality of users;
- an operation management center configured to determine an operation plan of said on-demand vehicle based on requests received from said plurality of users, and manage an operation of said on-demand vehicle in accordance with said determined operation plan; and
- an information terminal device to be operated by each of said plurality of users to supply the requests to said operation management center,
- wherein said operation management center is configured to:
  - divide an operation area in which said on-demand vehicle operates into a plurality of predetermined sub-areas;
  - search for routes on which said on-demand vehicle can travel for said each divided sub-area;
  - determine one of said searched routes as a determined route;
- determine whether there is a remote location which is separated from said determined route and is likely to be additionally requested by at least one of said users to pass through;
- store said determined route as a basic route and a time required for said on-demand vehicle to pass through said basic route as a required time when there is no remote location;
- store said determined route as a route other than the basic route and a time including a time required for said on-demand vehicle to pass through said basic route and a predetermined adjustment time that is a time required for said on-demand vehicle to pass through said remote location when traveling on said determined route as the required time when there is said remote location; and
- determine one of said basic route and said route other than the basic route as said operation plan based on the requests and the required time.

8. An on-demand vehicle operation management system according to claim 7, wherein said operation management center is further configured to change, when receiving an additional request after said operation plan has been determined, said operation plan using said predetermined adjustment time so as to allow said on-demand vehicle to pass through desired boarding/drop-off locations requested by said additional request and allow said on-demand vehicle to operate at a desired time requested by said additional request.

9. An on-demand vehicle operation management system according to claim 7, wherein said operation management center is further configured to determine said operation plan so as to allow break time to be secured for a driver of said on-demand vehicle.

10. An on-demand vehicle operation management device, comprising:
- circuitry configured to determine an operation plan of an on-demand vehicle based on requests received from a plurality of users and manage an operation of said on-demand vehicle in accordance with said determined operation plan, wherein said circuitry is configured to:
  - divide an operation area in which said on-demand vehicle operates into a plurality of predetermined sub-areas;
  - search, when receiving requests from said users as current requests, respectively, before said operation plan of said on-demand vehicle is determined, for candidate routes that each allow said on-demand vehicle to pass through desired boarding/drop-off locations requested by said current requests, and allow said on-demand vehicle to operate at a desired time requested by said current requests;
  - calculate, before said operation plan of said on-demand vehicle is determined, a predetermined evaluation expression for all said searched candidate routes to select a candidate route having an optimal solution as a determined route;
  - determine whether there is a remote location which is separated from said determined route and is likely to be additionally requested by at least one of said users to pass through;
  - store said determined route as a basic route and a time required for said on-demand vehicle to pass through said basic route as a required time when there is no remote location;
  - store said determined route as a route other than the basic route and a time including a time required for said on-demand vehicle to pass through said basic route and a predetermined adjustment time that is a time required for said on-demand vehicle to pass through said remote location when traveling on said determined route as the required time when there is said remote location; and
  - determine one of said basic route and said route other than the basic route as said operation plan based on the requests and the required time; and
  - change, when receiving an additional request after said operation plan has been determined, said operation plan using said predetermined adjustment time so as to allow said on-demand vehicle to pass through desired boarding/drop-off locations requested by said additional request and to allow said on-demand vehicle to operate at desired time requested by said additional request.

11. An on-demand vehicle operation management device according to claim 10, wherein said circuitry is configured to:
- determine whether there is said remote location based on at least one past request in said determination of said operation plan, said at least one past request having time slots and said sub-areas corresponding to time slots and said sub-areas of said current requests, respectively and a frequency of said at least one past request being high.

12. An on-demand vehicle operation management device according to claim 10, wherein said circuitry is further configured to determine said operation plan so as to allow break time to be secured for a driver of said on-demand vehicle.

13. An on-demand vehicle operation management device according to claim 1, wherein said predetermined adjustment time includes a plurality of predetermined adjustment times each corresponding to one of the plurality of predetermined sub-areas.

\* \* \* \* \*